United States Patent
Sumi et al.

(10) Patent No.: US 8,833,949 B2
(45) Date of Patent: Sep. 16, 2014

(54) MIRROR DEVICE FOR VEHICLE

(75) Inventors: Isao Sumi, Aichi-ken (JP); Nobuhiro Kudo, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 202 days.

(21) Appl. No.: 13/305,268

(22) Filed: Nov. 28, 2011

(65) Prior Publication Data

US 2012/0134038 A1 May 31, 2012

(30) Foreign Application Priority Data

Nov. 30, 2010 (JP) .................................. 2010-267553

(51) Int. Cl.
*G02B 5/08* (2006.01)
*B60R 1/072* (2006.01)

(52) U.S. Cl.
CPC ................. *B60R 1/072* (2013.01); *B60R 1/602* (2013.01)
USPC ........................................................ 359/872

(58) Field of Classification Search
USPC .............. 359/838–883; 701/49; 248/476–477
See application file for complete search history.

(56) References Cited

U.S. PATENT DOCUMENTS

| | | | | |
|---|---|---|---|---|
| 5,353,466 A | * | 10/1994 | Smith et al. | 15/250.003 |
| 7,156,532 B2 | * | 1/2007 | Stonecypher | 359/865 |

FOREIGN PATENT DOCUMENTS

| | | |
|---|---|---|
| CN | 101758798 | 6/2010 |
| JP | S60-061944 | 4/1985 |
| JP | S6357351 A | 3/1988 |
| JP | 08-175267 | 7/1999 |
| JP | 2010116012 A | 5/2010 |
| WO | 2006040799 | 4/2006 |

OTHER PUBLICATIONS

Chinese Office Action dated Feb. 27, 2014.
Japanese Office Action dated Mar. 25, 2014 and English translation of notice of reasons for rejection.

* cited by examiner

*Primary Examiner* — Jennifer L. Doak
(74) *Attorney, Agent, or Firm* — Roberts Mlotkowski Safran & Cole P.C.

(57) ABSTRACT

Suppressing liquid from seeping into an adjusting section through a discharge hole. In a vehicle door mirror device an opening hole in a holder portion of a mirror-surface adjustment-device is in communication with opening outlet of a mirror holder outer through an opening outlet in the mirror holder outer and a gap between the mirror and the mirror holder outer. Accordingly, even suppose water seeps into the mirror-surface adjustment-device through the opening hole in the holder portion, the water would be externally discharged outside the mirror holder outer through the opening hole, the opening outlet, the gap and the opening outlet. Furthermore, even suppose water at high pressure from outside the mirror holder outer is to reach the opening outlet, the water can be suppressed from seeping into the mirror-surface adjustment-device through the opening outlet and the opening hole due to the water pressure being reduced in the gap.

8 Claims, 5 Drawing Sheets

MIRROR DEVICE FOR VEHICLE

CROSS-REFERENCE TO RELATED APPLICATION

This application claims priority under 35 USC 119 from Japanese Patent Application No. 2010-267553 filed Nov. 30, 2010, the disclosure of which is incorporated by reference herein.

BACKGROUND OF THE INVENTION

1. Field of the Invention

The present invention is related to a mirror device for a vehicle in which the mirror surface angle of a mirror is adjustable.

2. Description of the Related Art

In a remote-controlled electrical vehicle mirror described in Japanese Patent Application Laid-Open (JP-A) No. 8-175267, a motor is housed in a housing, and the mirror surface angle of a mirror is adjusted by driving a motor to turn the mirror. A water escape hole is also formed in the lower end of the housing, and water that has seeped into the housing is externally discharged from the housing through the water escape hole.

However, in such a remote-controlled electrical vehicle mirror the inside of the housing is exposed through the water escape hole. This results in water easily seeping into the housing through the water escape hole.

SUMMARY OF THE INVENTION

In consideration of the above circumstances the present invention is directed towards a mirror device for a vehicle capable of suppressing liquid from seeping into an adjusting section through a discharge hole.

A mirror device for a vehicle of a first aspect of the present invention includes: a mirror; a covering member that covers a back face side of the mirror and that is provided with a discharge outlet through which liquid between the covering member and the mirror is externally discharged; and an adjusting section that adjusts a mirror surface angle of the mirror by turning the mirror together with the covering member, the adjusting section retaining the covering member and being provided with a discharge hole that communicates to a space between the mirror and the covering member, and liquid seeped inside the adjusting section being discharged through the discharge hole to the space between the mirror and the covering member.

A mirror device for a vehicle of a second aspect of the present invention is the mirror device for a vehicle of the first aspect wherein the discharge hole opens a lower end of the adjusting section inside the adjusting section.

A mirror device for a vehicle of a third aspect of the present invention is the mirror device for a vehicle of the first aspect or the second aspect further including a restriction wall that is provided at the covering member, the restriction wall restricting liquid from seeping inside the adjusting section by covering a periphery of the adjusting section.

It is possible in the aspects that the discharge hole opens a lowermost end which is at an interior side of the adjusting section to the space.

It is possible in the aspects that a communicating discharge outlet is further provided at the covering member, the communicating discharge outlet and the discharge hole being communicated, and the discharge hole opens the interior side lowermost end of the adjusting section to the space via the communicating discharge outlet.

It is possible in the aspects that a lower face of the discharge hole and a lower face of the communicating discharge outlet are flush with each other.

In the mirror device for a vehicle of the first aspect of the present invention, the covering member covers the back face side of the mirror, the adjusting section retains the covering member, and the mirror surface angle of the mirror is adjusted by operating the adjusting section to turn the mirror together with the covering member.

The discharge hole provided at the adjusting section communicates to the space between the mirror and the covering member, and the discharge outlet is provided at the covering member. Water that has seeped into the adjusting section is discharged through the discharge hole to the space between the mirror and the covering member, and then discharged through the discharge outlet to the outside of the covering member.

As described above, the discharge hole of the adjusting section communicates to the space between the mirror and the covering member. Accordingly liquid can be suppressed by the mirror and the covering member from seeping into the adjusting section through the discharge hole.

In the mirror device for a vehicle of the second aspect of the present invention, the discharge hole is open to the lower end of the adjusting section inside the adjusting section. Liquid that has seeped into the adjusting section can accordingly be efficiently externally discharged from the adjusting section through the discharge hole.

In the mirror device for a vehicle of the third aspect of the present invention, the restriction wall provided at the covering member restricts seeping of liquid into the adjusting section by covering the periphery of the adjusting section. Seeping of liquid into the adjusting section can accordingly be suppressed.

BRIEF DESCRIPTION OF THE DRAWINGS

Exemplary embodiments of the present invention will be described in detail based on the following figures, wherein.

DETAILED DESCRIPTION OF THE INVENTION

Figure 1:
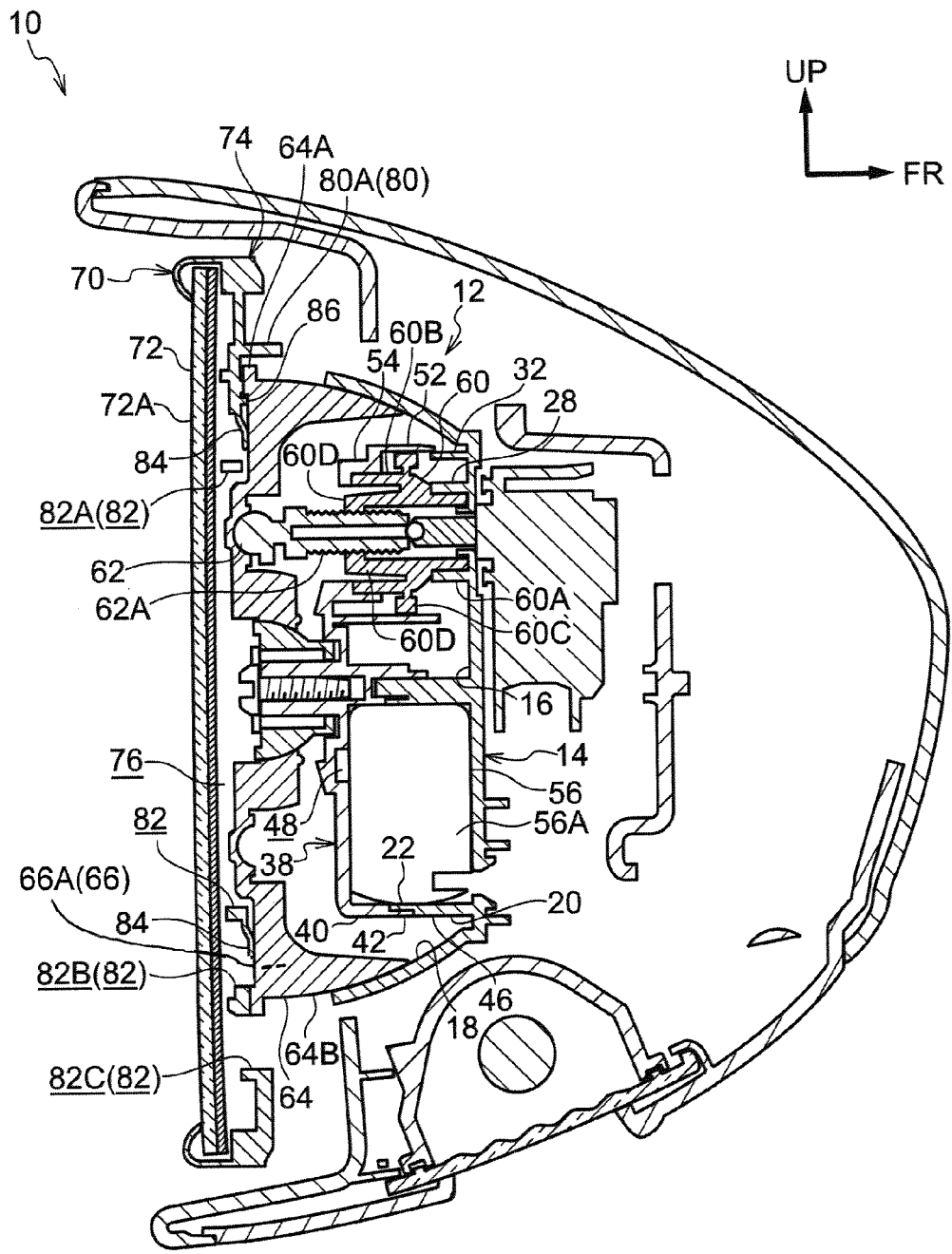
FIG. 1 is a cross-section (a cross-section taken at the position of line 1-1 in FIG. 4) illustrating a vehicle door mirror apparatus according to an exemplary embodiment of the present invention, as viewed from a vehicle width direction outside direction.
Figure 2:
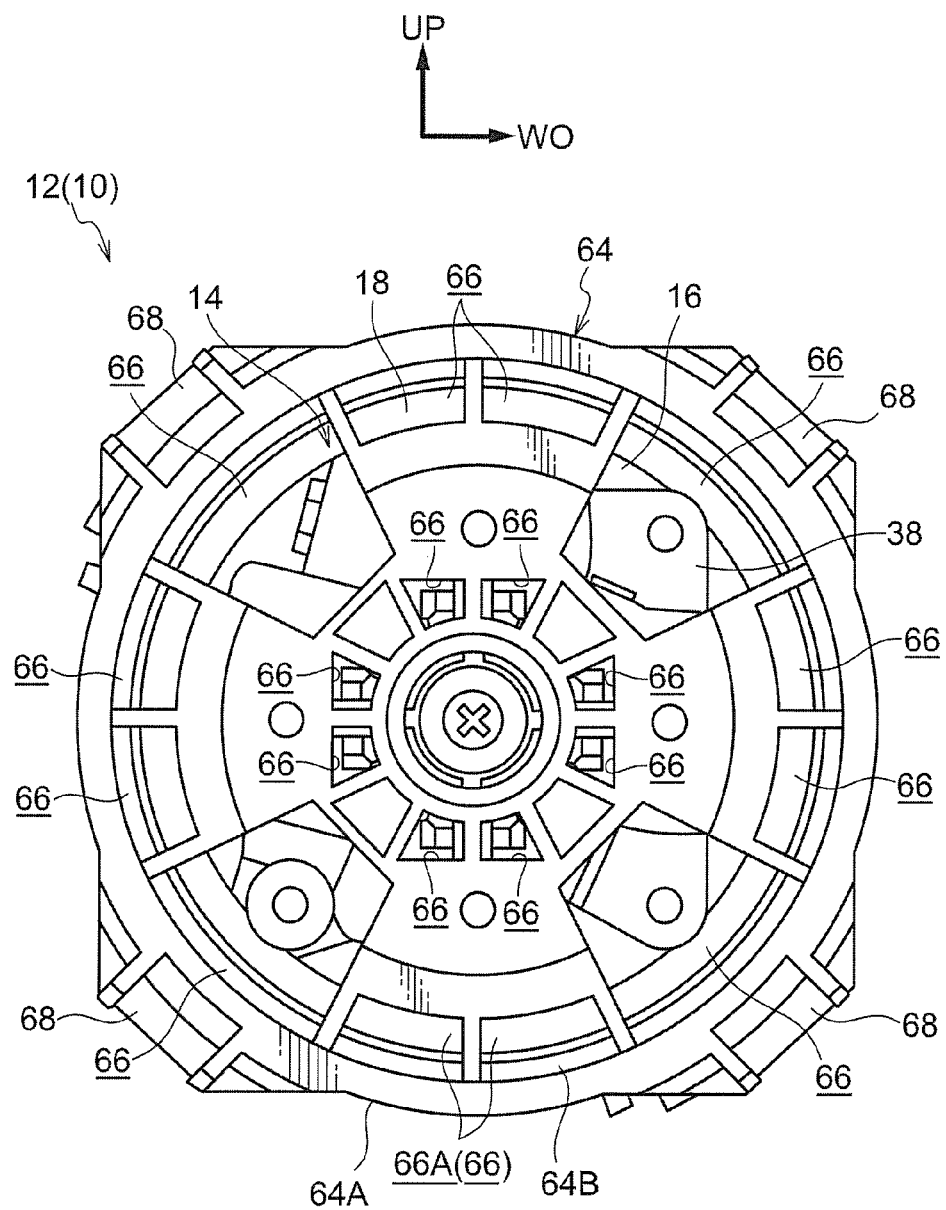
FIG. 2 is a face-on view illustrating a mirror surface adjustment device of a vehicle door mirror apparatus according to an exemplary embodiment of the present invention, as viewed from the vehicle rear direction.

FIG. 1 is a cross-section (a cross-section taken on line 1-1 of FIG. 4) as viewed from the vehicle width direction outside (vehicle right hand side) of a vehicle door mirror device 10 according to an exemplary embodiment in which the present invention is applied to a mirror device for a vehicle. FIG. 2 is a face-on (front) view as viewed from the vehicle rear direction of main portions of the vehicle door mirror device 10. In the drawings arrow FR indicates the vehicle front direction, arrow WO indicates the vehicle width direction outside, and arrow UP indicates the upward direction.

The vehicle door mirror device 10 according to the present exemplary embodiment is mounted to a vehicle door, with a mirror surface adjustment device 12 (mirror surface angle adjustment device) serving as an adjusting section illustrated in FIG. 1 and FIG. 2 internally provided to the vehicle door mirror device 10.

Figure 3:
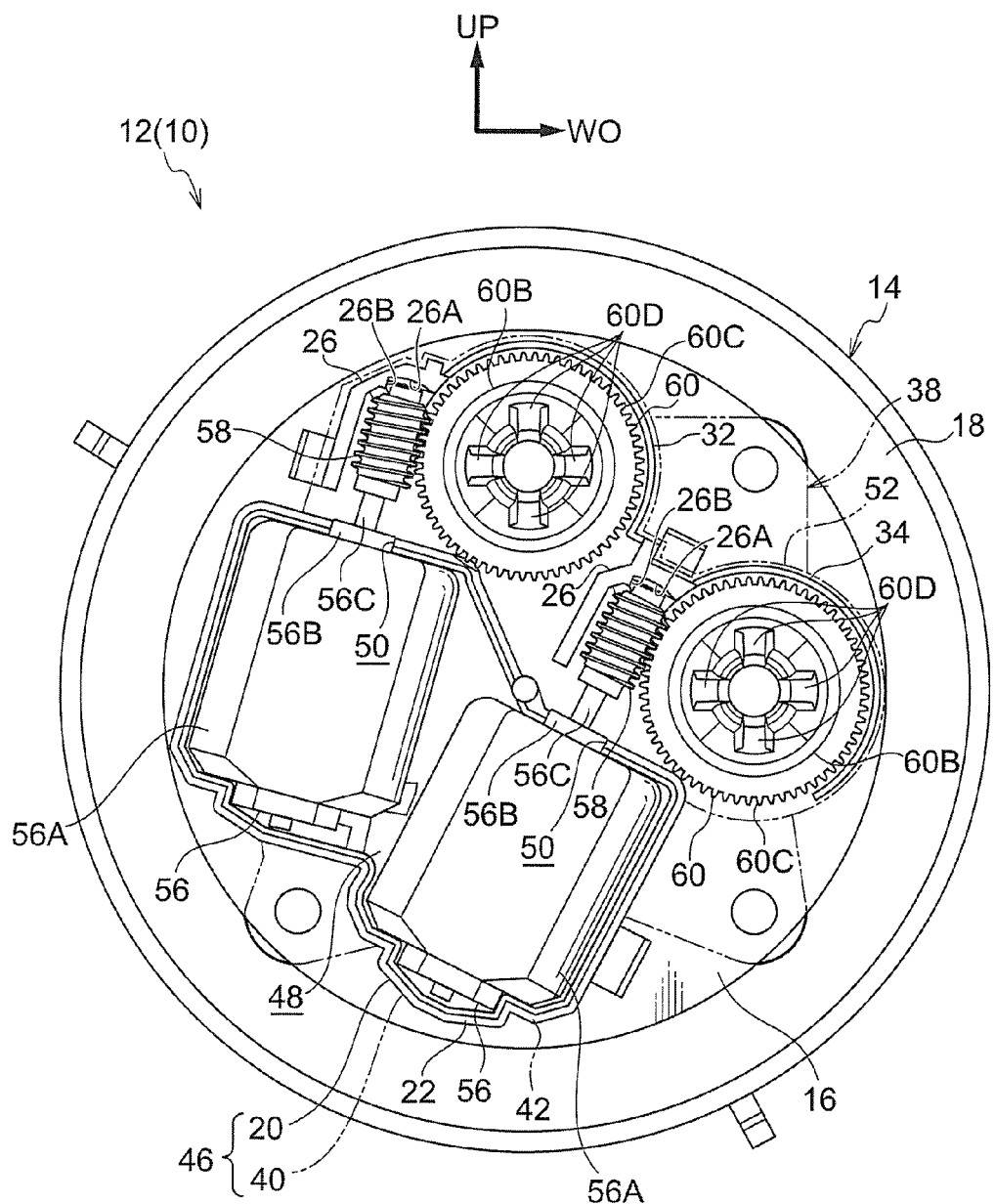
FIG. 3 is a face-on view illustrating a case, motors, worm gears and wheel drives of a mirror surface adjustment device in a vehicle door mirror apparatus according to an exemplary embodiment of the present invention, as viewed from the vehicle rear direction.
Figure 5:
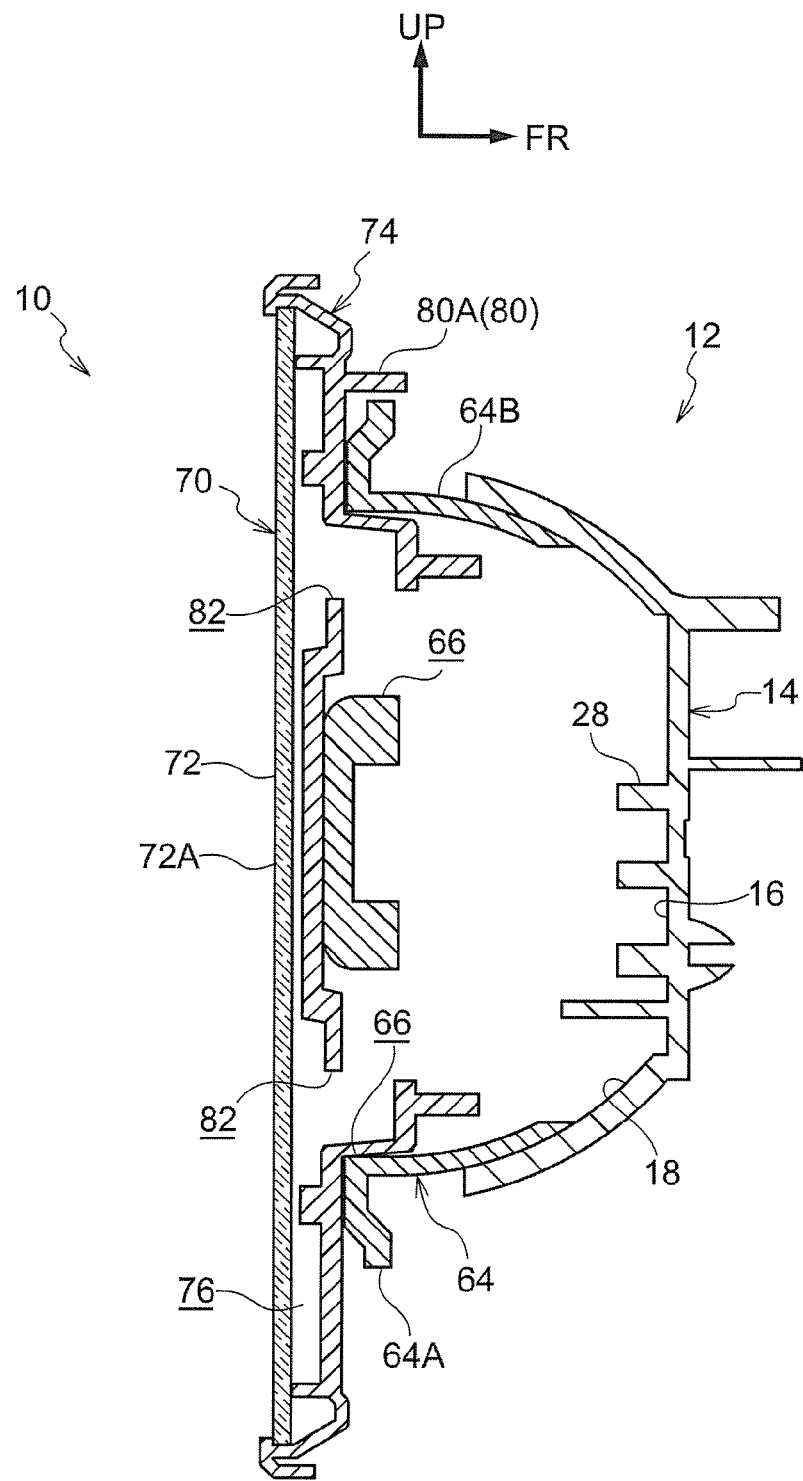
FIG. 5 is a cross-section (a cross-section taken at the position of line 5-5 of FIG. 4) illustrating a vehicle door mirror apparatus according to an exemplary embodiment of the present invention, as viewed from a vehicle width direction outside direction.

As shown in FIG. 1, FIG. 3 and FIG. 5, the mirror surface adjustment device 12 is provided with a case 14 (a case upper) that serves as a mounting member configuring a housing member and is formed from resin in a substantially semi-spherical container shape. The case 14 is fixed at the inside of the vehicle door mirror device 10. The vehicle rear side face of the case 14 is open, and a vehicle front side face on the inner peripheral side of the case 14 configures a circular flat plane shaped bottom face 16 disposed perpendicular to the vehicle front-rear direction. The vehicle rear side face at the inner peripheral side of the case 14 configures a ring shaped turning face 18. The turning face 18 curves round in a spherical face shape centered on a turn center of a mirror holder inner 64, described below, and disposed coaxially to the bottom face 16.

A frame profile plate shaped housing wall 20 is integrally formed at a lower side portion of the bottom face 16 of the case 14. The housing wall 20 projects out from the bottom face 16 towards the vehicle rear side. A frame profile plate shaped fitting wall 22 configuring a fitting section is integrally formed to a vehicle rear side end of the housing wall 20 on an inner peripheral side portion thereof. The fitting wall 22 is configured with a thickness that is thinner than other portions of the housing wall 20.

A pair of substantially L-profile cross-section plate shaped shaft receiving walls 26, serving as stopper portions (shaft receiving portions) configuring a blocking wall, are integrally formed to upper side portion of the bottom face 16 of the case 14, with the shaft receiving walls 26 projecting out from the bottom face 16 towards the vehicle rear side. The inside face of each of the shaft receiving walls 26 configures an axial direction shaft receiving face 26A, serving as an axial direction stopper face. The shaft receiving faces 26A are formed so as to curve around in an indented (concave) shape. A radial direction shaft receiving face 26B serving as a radial direction stopper face is formed on the inside face of each of the shaft receiving walls 26. The radial direction shaft receiving faces 26B are formed with a flat-plane shape.

A circular cylindrical shaped first support cylinder 28 configuring a support wall is integrally formed to the bottom face 16 of the case 14 at the side of each of the shaft receiving walls 26. The first support cylinders 28 project out from the bottom face 16 towards the vehicle rear side.

Substantially semi-circular cylindrical shaped connection walls 32, 34 configuring blocking walls are integrally formed to the bottom face 16 of the case 14 above each of the first support cylinders 28. The connection walls 32, 34 project out from the bottom face 16 towards the vehicle rear side and are disposed coaxially to each of the respective first support cylinders 28. One connection wall 32 connects one of the shaft receiving walls 26 to the other of the shaft receiving walls 26, and the other connection wall 34 is connected to the other shaft receiving wall 26.

As shown in FIG. 1 to FIG. 3 a substantially container shaped case-inner 38 (a case-lower) made from resin and serving as a fixing member configuring a housing member is fixed to the bottom face 16 of the case 14.

A frame profile plate shaped housing frame 40 is integrally formed to a lower side portion of the case-inner 38. The housing frame 40 projects out from the case-inner 38 towards the vehicle front side. A frame profile plate shaped fitting frame 42 configuring a fitting section is integrally formed at the vehicle front side end of the housing frame 40, on an outside peripheral portion thereof. The fitting frame 42 is configured thinner than other portions of the housing frame 40.

The housing frame 40 is fitted together with the housing wall 20 of the case 14 in a state in which the fitting frame 42 is fitted over (overlapped with) the fitting wall 22 of the case 14. The housing wall 20 and the housing frame 40 configure an outer peripheral wall 46.

A housing space 48 is configured inside the outer peripheral wall 46 between the case-inner 38 and the bottom face 16 of the case 14, with the whole of the outer periphery of the housing space 48 surrounded by the outer peripheral wall 46. A pair of circular shaped fitting holes 50 are formed so as to pierce respectively through the upper side portions of the outer peripheral wall 46. The fitting holes 50 are disposed so as to span the housing wall 20 and the housing frame 40.

A plate shaped covering wall 52 configuring a blocking wall is integrally formed at a upper side portion of the case-inner 38. The covering wall 52 projects out from the case-inner 38 towards the vehicle front side. The covering wall 52 fits together with the pair of the shaft receiving walls 26 and the connection walls 32, 34 of the case 14, and both length direction ends of the covering wall 52 are connected to the housing frame 40.

A pair of circular cylindrical shaped second support cylinders 54 configuring a support wall are integrally formed to upper side portions of the case-inner 38 inside the covering wall 52. The second support cylinders 54 project out from the case-inner 38 to the vehicle front side, and are disposed coaxially to the first support cylinders 28 of the case 14.

As shown in FIG. 1 to FIG. 3 a pair of motors 56 serving as drive sections are housed between the case 14 and the case-inner 38. A motor body 56A is provided to each of the motors 56. The pair of the motor bodies 56A are housed inside the housing space 48 and the whole of the outer periphery is surrounded by the outer peripheral wall 46. The pair of motor bodies 56A are positioned by the case 14, the case-inner 38 and the outer peripheral wall 46, and are fixed inside the housing space 48.

A circular ring plate shaped shaft bearing 56B serving as a closure section is fixed to the motor body 56A. The shaft bearings 56B fit into the fitting holes 50 of the outer peripheral wall 46, closing off the fitting holes 50. An output shaft 56C of each of the motors 56 passes from the motor body 56A through inside the shaft bearing 56B to extend outside the housing space 48. Each of the output shafts 56C fits inside and is supported by the respective shaft bearing 56B.

A worm gear 58 made from resin and serving as an output gear is provided to the output shaft 56C of each of the motors 56. The worm gear 58 is capable of rotating integrally with the output shaft 56C. Accordingly, each of the worm gears 58 is rotated as one with the output shaft 56C by the motor 56 being driven by operation of the mirror surface adjustment device 12 so as to rotate the output shaft 56C.

The worm gear 58 is disposed at the inside of the shaft receiving wall 26 of the case 14, and a leading end portion of each of the worm gears 58 (a portion on the opposite side to the output shaft 56C) faces the respective axial direction shaft receiving face 26A of the shaft receiving wall 26 along the axial direction, and faces the respective radial direction shaft receiving face 26B of the shaft receiving wall 26 along the radial direction. Consequently, particularly, as described later, when rotation of the worm gear 58 is restricted in a state in which the motor 56 is driven, movement (sliding) of the worm gear 58 along the axial direction is stopped by the axial direction shaft receiving face 26A, and movement (tilting) of the worm gear 58 in the radial direction is stopped by the radial direction shaft receiving face 26B.

A pair of substantially circular cylindrical shaped wheel drives 60 made from resin and serving as rotation gears are provided between the bottom face 16 of the case 14 and the case-inner 38. A circular cylindrical shaped first rotation cylinder 60A is formed at a portion on the vehicle front side of each of the wheel drives 60. A circular cylindrical shaped second rotation cylinder 60B is formed at a portion on the vehicle rear side of each of the wheel drives 60. The first rotation cylinder 60A and the second rotation cylinder 60B are disposed coaxially to each other. The first rotation cylinder 60A and the second rotation cylinder 60B fit respectively inside the first support cylinder 28 of the case 14 and inside the second support cylinder 54 of the case-inner 38. Each of the wheel drives 60 is rotatably supported by the first support cylinder 28 and the second support cylinder 54. The first rotation cylinder 60A and the second rotation cylinder 60B make contact respectively with the bottom face 16 of the case 14 and the case-inner 38, thereby stopping movement (sliding) of the wheel drives 60 in the axial direction.

One of the wheel drives 60 is disposed coaxially at the inner peripheral side of the connection wall 32 of the case 14 and at the inside of the covering wall 52 of the case-inner 38. The other of the wheel drives 60 is disposed coaxially at the inner peripheral side of the connection wall 34 of the case 14 and at the inside of the covering wall 52 of the case-inner 38. The outer periphery of the one of the wheel drives 60 is disposed along the connection wall 32 and the covering wall 52, and the outer periphery of the other of the wheel drives 60 is disposed along the connection wall 34 and the covering wall 52.

A worm wheel 60C serving is an engagement portion is formed coaxially to the wheel drive 60 at an intermediate portion in the vehicle front-rear direction. Each of the worm wheels 60C is meshed (engaged) with the respective worm gear 58. Accordingly, the worm wheel 60C is rotated by driving the motor 56 and rotating the worm gear 58, thereby rotating the wheel drive 60.

A specific number (four in the present exemplary embodiment) of meshing claws 60D are formed to each of the wheel drives 60 at the inner peripheral side of the second rotation cylinder 60B. The specific number of meshing claws 60D are disposed at even intervals around the circumferential direction of the wheel drive 60 and the base end portions (vehicle front side ends) are integrally formed to the worm wheel 60C. The meshing claws 60D are resilient. The leading ends (the vehicle rear side ends) of the meshing claws 60D project out to the radial direction inside of the wheel drive 60.

A substantially circular shaft shaped rod drive 62 serving as a drive member is inserted inside each of the wheel drives 60 and rotation of the rod drive 62 about a center axis is restricted. One of the wheel drives 60 is disposed above the central axis of the bottom face 16 of the case 14 (configuration may also be made below the central axis), and the other of the wheel drives 60 is disposed to the vehicle width direction outside of the central axis of the bottom face 16 (configuration may be made to the vehicle width direction inside of the central axis).

A portion of the rod drive 62 other than the leading end portion (the vehicle rear side end portion) configure a screw 62A, and the leading ends of the meshing claws 60D of the wheel drive 60 mesh (engage) with the screw 62A. Accordingly, as described above, by driving the motor 56 to rotate the wheel drive 60 (including the meshing claws 60D), the meshing position with the screw 62A of the leading ends of the meshing claws 60D is displaced, and the rod drive 62 is moved (slid) in the vehicle front-rear direction.

As shown in FIG. 1, FIG. 2 and FIG. 5, the mirror holder inner 64 serving as a retaining (holding) member is provided at the vehicle rear side of the case 14. A substantially circular plate shaped holder portion 64A is formed at a portion on the vehicle rear side end of the mirror holder inner 64. The center of the holder portion 64A is retained (held) by the case-inner 38 so as to be capable of turning, and accordingly the mirror holder inner 64 is retained by the case-inner 38 so as to be capable of turning.

The holder portion 64A is retained (held) by a leading end portion (a portion at the vehicle rear side end) of the rod drive 62 so as to be capable of turning. By driving the motors 56 as described above, the rod drives 62 are moved in the vehicle front-rear direction, thereby driving and turning the mirror holder inner 64. Turning of the mirror holder inner 64 is stopped when the outer peripheral edge of the holder portion 64A makes contact with the vehicle rear side end face of the case 14, thereby restricting rotation of the wheel drive 60 and restricting rotation of the worm gear 58.

A substantially semi-spherical wall shaped turn wall 64B is integrally formed to the vehicle front side face of the holder portion 64A. The vehicle front side face of the turn wall 64B is open. The turn wall 64B curves around in a spherical shape centered on the turn center of the mirror holder inner 64. The turn wall 64B makes contact with (is pressed by) the turning face 18 of the case 14. Accordingly, the turn wall 64B is slid on the turning face 18 by turning the mirror holder inner 64.

Plural opening holes 66 are formed in the holder portion 64A so as to pass through at the inner peripheral side of the turn wall 64B. The plural opening holes 66 open the inside of the mirror surface adjustment device 12 (the inside of the case 14 and the inside of the turn wall 64B) towards the vehicle rear side. In particular, the opening hole 66 in the lower end portion of the holder portion 64A (referred to below as the opening holes 66A) functions as a discharge hole, and opens the lowermost end which is at the interior of the mirror surface adjustment device 12 towards the vehicle rear side.

A specific number (four in the present exemplary embodiment) of substantially circular pillar shaped assembly pillars 68 configuring an assembly section are integrally provided at the outer peripheral outside of the holder portion 64A. The specific number of assembly pillars 68 are disposed with even intervals around the circumferential direction of the holder portion 64A.

The entire periphery of the worm gears 58, the wheel drives 60 and the rod drives 62, the case-inner 38 (including inside the covering wall 52 and inside the second support cylinder 54), the mirror holder inner 64, and the case 14 (including inside the shaft receiving walls 26, the inner peripheral side of the connection walls 32, 34 and inside the first support cylinder 28) peripheral of the worm gears 58, the wheel drives 60 and the rod drives 62 are coated in a grease (not shown in the drawings) serving as a lubrication agent. Rotation of the worm gears 58 and the wheel drives 60 and movement of the rod drives 62 are thereby performed smoothly.

Figure 4:
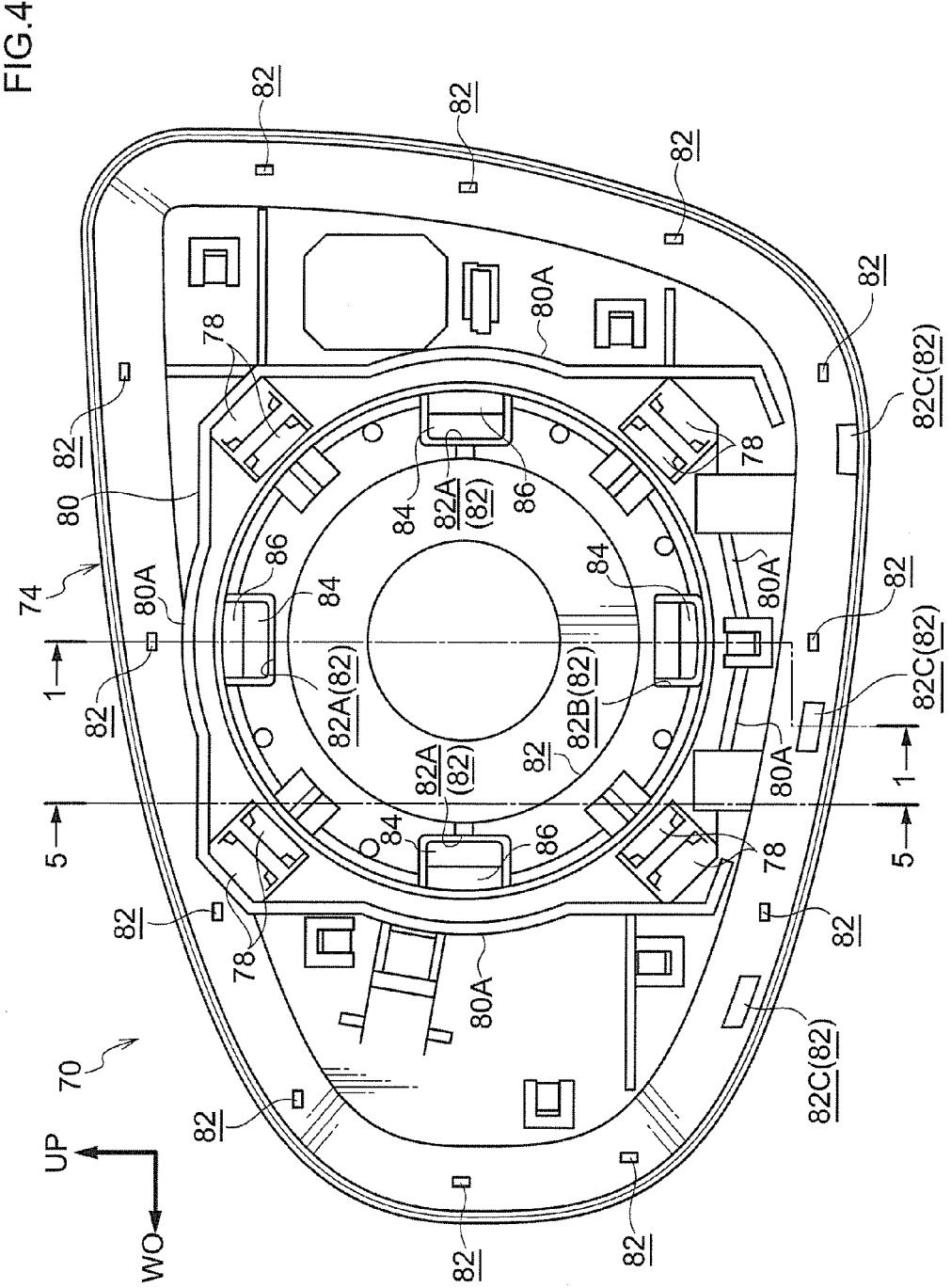
FIG. 4 is a back face view illustrating a mirror body of a vehicle door mirror apparatus according to an exemplary embodiment of the present invention, as viewed from the vehicle front direction.

As shown in FIG. 1, FIG. 4 and FIG. 5, a mirror body 70 is assembled and retained at the vehicle rear side of the holder portion 64A of the mirror holder inner 64.

A substantially rectangular profile plate shaped mirror 72 is provided to a vehicle rear side portion of the mirror body 70, with the vehicle rear side face (front face) of the mirror 72 configuring a mirror (finished) surface 72A. An occupant in a vehicle is thereby able to view towards the vehicle rear side using the mirror 72.

A substantially U-shape cross-sectioned plate shaped mirror holder outer 74 serving as a covering member is provided to a vehicle front side portion of the mirror body 70. The inside of the mirror holder outer 74 is open towards the vehicle rear side. The mirror 72 is fixed and retained inside the mirror holder outer 74. The mirror holder outer 74 covers the vehicle front side (the back face side) of the mirror 72 and all the periphery of the mirror 72, with a gap (space) 76 formed in the vehicle front-rear direction between the mirror holder outer 74 and the mirror 72.

A specific number of pairs (four pairs in the present exemplary embodiment) of assembly claws 78 configuring an assembly section are provided to the mirror holder outer 74. The base ends of the assembly claws 78 are integrated to the mirror holder outer 74, and the assembly claws 78 are resilient and extend out towards the vehicle front side. The assembly claws 78 in each of the pairs face each other, and in each pair, the leading ends of the assembly claws 78 each projects out towards the side of the facing assembly claw 78. The assembly pillars 68 of the mirror holder inner 64 are nipped by resilient force between the respective pairs of assembly claws 78. The mirror body 70 (the mirror holder outer 74) is thereby detachably assembled to (retained by) the mirror holder inner 64 (the holder portion 64A). The outer peripheral edge of the holder portion 64A makes face contact with the mirror holder outer 74 around the entire periphery.

A substantially frame profile plate shaped waterproofing wall 80 serving as a restriction wall (a guide wall and a reinforcement wall) is integrally formed to the mirror holder outer 74. The waterproofing wall 80 projects out from the mirror holder outer 74 towards the vehicle front side. The waterproofing wall 80 is of substantially rectangular in shape when viewed face-on. The holder portion 64A (including the specific number of assembly pillars 68) of the mirror holder inner 64 is disposed at the inside vicinity of the waterproofing wall 80. The waterproofing wall 80 covers the periphery of the holder portion 64A (including the specific number of assembly pillars 68). Projection portions 80A are configured at length direction intermediate portions on the top portion, bottom portion, and vehicle width direction outside portion and vehicle width direction inside portion of the waterproofing wall 80. The projection portions 80A correspond to the outer periphery of the holder portion 64A and project (curve) out to the outside of the waterproofing wall 80. The bottom portion of the waterproofing wall 80, including the lowermost end of the projection portion 80A, is not continuous, that is, there are portions where wall is not formed in the bottom portion of the waterproofing wall 80.

Plural opening outlets (openings) 82 are formed so as to pierce through the mirror holder outer 74. The plural opening outlets 82 open the gap 76 between the mirror 72 and the mirror holder outer 74 towards the vehicle front side.

Plate shaped resilient claws 84 are provided inside the opening outlets 82 (referred to below as opening outlets 82A) disposed at the top portion, the vehicle width direction outside portion and the vehicle width direction inside portion, inside the waterproofing wall 80. The resilient claws 84 are integrated to the peripheral edges on the waterproofing wall 80 side of the opening outlets 82A. A similar resilient claw 84 is also provided inside the opening outlet 82 disposed at the bottom portion inside the waterproofing wall 80 (referred to below as the opening outlet 82B), and this resilient claw 84 is integrated to the upper edge of the opening outlet 82B. Each of the resilient claws 84 uses resilient force thereof to press the holder portion 64A of the mirror holder inner 64 towards the vehicle front side, thereby restricting the mirror body 70 from rattling with respect to the mirror holder inner 64.

A substantially rectangular parallelopiped contact pillar 86 is integrally formed to the mirror holder outer 74 inside the opening outlet 82A at the waterproofing wall 80 side of the resilient claw 84. The contact pillars 86 project out from the mirror holder outer 74 towards the vehicle front side. The contact pillars 86 are inserted into the opening holes 66 of the holder portion 64A, the contact pillar 86 making face contact with the peripheral edge of the opening hole 66 that is disposed on the outer peripheral side of the holder portion 64A.

The opening outlet 82B functions as a through (communicating) outlet and faces the opening hole 66A of the holder portion 64A. The bottom face of the opening outlet 82B is flush with (in the same plane as) the bottom face of the opening hole 66A.

Plural opening outlets 82 at the bottom end portion of the mirror holder outer 74 (referred to below as the opening outlets 82C) function as discharge outlets. The bottom edge of the opening outlet 82C that is disposed at the lowermost end of the mirror holder outer 74, among the plural opening outlets 82C, is flush with (in the same plane as) the lowermost face of the gap 76 between the mirror 72 and the mirror holder outer 74. The whole of the bottom face of the gap 76 slopes downwards towards the opening outlet 82C disposed at the lowermost end of the mirror holder outer 74.

Explanation follows regarding operation of the present exemplary embodiment.

For the vehicle door mirror device 10 configured as described above, in the mirror surface adjustment device 12 the worm gears 58 are rotated by driving the motors 56 so as to rotate the output shafts 56C, thereby rotating the respective wheel drive 60 (including the worm wheel 60C and the specific number of the meshing claws 60D) and moving the respective rod drive 62 in the vehicle front-rear direction. The mirror holder inner 64 and the mirror body 70 (the mirror 72 and the mirror holder outer 74) are accordingly turned by the rod drive(s) 62 in at least one of the up-down direction and/or the vehicle width direction, thereby adjusting the angle of the mirror surface 72A of the mirror 72 in at least one of the up-down direction and/or the vehicle width direction.

During assembling the mirror body 70 to the mirror holder inner 64, by inserting (fitting) the holder portion 64A (including the specific number of assembly pillars 68) of the mirror holder inner 64 inside the waterproofing wall 80 of the mirror holder outer 74, the assembly pillars 68 of the mirror holder inner 64 are nipped between the respective pairs of assembly claws 78 of the mirror holder outer 74 due to temporary resilient deformation of the assembly claws 78. Assembly of the mirror body 70 to the mirror holder inner 64 can accordingly be guided by the waterproofing wall 80.

Furthermore, due to the mirror holder outer 74 being reinforced by the waterproofing wall 80, the rigidity of the mirror holder outer 74 can be raised, chatter of the mirror 72 (the mirror surface 72A) during vehicle travel can be suppressed, and visibility with the mirror 72 can be enhanced.

The waterproofing wall 80 of the mirror holder outer 74 covers the periphery of the holder portion 64A of the mirror holder inner 64 (in particular, all of the top side and both vehicle width direction sides). Water can accordingly be suppressed from reaching the mirror holder inner 64. Furthermore, the outer peripheral edge of the holder portion 64A makes face contact with the mirror holder outer 74 over the entire periphery, and the contact pillars 86 at the top side and the two vehicle width direction sides of the mirror holder outer 74 make face contact with the peripheral edge of the respective opening holes 66 of the holder portion 64A. Due to water surface tension, water from the outer peripheral outside of the mirror holder inner 64 can be suppressed from seeping in from between the outer peripheral edge of the holder portion 64A and the mirror holder outer 74 towards between the peripheral edge of the opening hole 66 and the contact pillar 86. Water can accordingly be suppressed (restricted) from seeping through the opening holes 66 and into the mirror surface adjustment device 12 (inside the turn wall 64B and inside the case 14).

As described above, the waterproofing wall 80 functions to guide assembly of the mirror body 70 to the mirror holder inner 64, functions to reinforce the mirror holder outer 74, and also functions to suppress water from seeping into the mirror surface adjustment device 12. The mirror holder outer 74 can hence be made more compact, and the installation space required for the mirror holder outer 74 in the vehicle door mirror device 10 can be reduced.

The motor bodies 56A of the motors 56 are housed in the housing space 48 between the case 14 and the case-inner 38, and the fitting holes 50 in the outer peripheral wall 46 of the housing space 48 are closed off by the shaft bearings 56B of the motor bodies 56A. Further, the shaft bearings 56B and the output shafts 56C of the motors 56 and the worm gears 58 and the wheel drives 60 are covered by the case 14 (including the housing wall 20, the pair of shaft receiving walls 26 and the connection walls 32, 34) and the case-inner 38 (including the housing frame 40 and the covering wall 52).

Consequently, even suppose water is to seep into the mirror surface adjustment device 12 through the opening holes 66 in the holder portion 64A of the mirror holder inner 64, water can be suppressed or prevented from seeping onto the motors 56, the worm gears 58 and the wheel drives 60, and grease at the periphery of the worm gears 58 and the wheel drives 60 can be suppressed or prevented from being washed out.

Furthermore, the opening hole 66A at the lower end portion of the holder portion 64A is in communication with the opening outlet 82C at the lower end portion of the mirror holder outer 74 through the opening outlet 82B and the gap 76 between the mirror 72 and the mirror holder outer 74.

Consequently, even suppose water is to seep into the mirror surface adjustment device 12 through the opening hole 66 of the holder portion 64A, any such water would be discharged through the opening hole 66A and the opening outlet 82B into the gap 76, and discharged to outside the mirror holder outer 74 through the opening outlet 82C. Water can accordingly be suppressed from remaining inside the mirror surface adjustment device 12. This accordingly enables even better suppression or prevention of water from seeping onto the motors 56, the worm gears 58 and the wheel drives 60, and enables even better suppression or prevention of grease from being washed out from the periphery of the worm gears 58 and the wheel drives 60.

The opening hole 66A at the lower end portion of the holder portion 64A opens the interior side lowermost end of the mirror surface adjustment device 12 to the inside of the gap 76 through the opening outlet 82B. Water can accordingly be efficiently suppressed from remaining inside the mirror surface adjustment device 12, water can be efficiently suppressed or prevented from seeping onto the motors 56, the worm gears 58 and the wheel drives 60, and grease at the periphery of the worm gears 58 and the wheel drives 60 can be efficiently suppressed or prevented from being washed away.

Even if water is not completely prevented from penetrating into the mirror surface adjustment device 12, as described above, such water can be suppressed or prevented from seeping onto the worm gears 58 and the wheel drives 60, and grease at the periphery of the worm gears 58 and the wheel drives 60 can be suppressed or prevented from being washed out. It accordingly becomes unnecessary to employ a sealing member (such as a seal or grease) to seal the entire periphery of the mirror surface adjustment device 12, enabling a reduction in cost to be achieved. Furthermore, since air can pass freely through between the inside of the mirror surface adjustment device 12 and the outside of the mirror holder outer 74 through the opening holes 66, the gap 76 and the opening outlets 82, fogging up inside the mirror surface adjustment device 12 can be suppressed or prevented.

Furthermore, as described above, the opening hole 66A communicates with the opening outlet(s) 82C through the opening outlet 82B and the gap 76. Accordingly, even suppose, for example, water at high pressure is to reach the opening outlet 82C from outside the mirror holder outer 74, water can be suppress from seeping into the mirror surface adjustment device 12 through the opening outlet 82B and the opening hole 66A due to the pressure of the water being reduced in the gap 76.

Whereas in the present exemplary embodiment the present invention is applied to the vehicle door mirror device 10, configuration may also be made with the present invention applied to another external or internal mirror device for a vehicle.

What is claimed is:

1. A mirror device for a vehicle comprising:
   a minor;
   a covering member that covers a back face side of the mirror so as to be turned simultaneously with the mirror and that is provided with a discharge outlet through which liquid in a space between the covering member and the mirror is externally discharged; and
   an adjusting section that adjusts a mirror surface angle of the mirror by turning the mirror together with the covering member, the adjusting section retaining the covering member and being provided with a discharge hole that communicates to a space between the mirror and the covering member, and liquid seeped inside the adjusting section being discharged through the discharge hole to the space between the mirror and the covering member, the adjusting section including:
   a case member, and
   a holding member that is turnable with respect to the case member that holds the covering member so as to be turned simultaneously with the covering member and the minor, and at which the discharge hole is provided
   wherein the covering member further includes a communicating discharge outlet at a location that is different from the location of the discharge outlet, and which is aligned with the discharge hole of the adjusting section, and
   wherein the communicating discharge outlet, the discharge outlet and the discharge hole are separate openings with respect to each other.

2. The mirror device for a vehicle of claim 1, wherein the discharge hole opens a lower end of the adjusting section inside the adjusting section.

3. The mirror device for a vehicle of claim 1, further comprising a restriction wall that is provided at the covering member, the restriction wall restricting liquid from seeping inside the adjusting section by covering a periphery of the adjusting section.

4. The mirror device for a vehicle of claim 2, further comprising a restriction wall that is provided at the covering member, the restriction wall restricting liquid from seeping inside the adjusting section by covering a periphery of the adjusting section.

5. The mirror device for a vehicle of claim 2, wherein the discharge hole opens a lowermost end which is at an interior side of the adjusting section to the space.

6. The mirror device for a vehicle of claim 5, wherein a communicating discharge outlet is further provided at the covering member, the communicating discharge outlet and the discharge hole being communicated, and the discharge hole opens the interior side lowermost end of the adjusting section to the space via the communicating discharge outlet.

7. The mirror device for a vehicle of claim 6, wherein a lower face of the discharge hole and a lower face of the communicating discharge outlet are flush with each other.

8. A mirror device for a vehicle comprising:
a mirror;
a covering member that covers a back face side of the mirror so as to be turned simultaneously with the mirror and that is provided with a discharge outlet through which liquid in a space between the covering member and the mirror is externally discharged; and
an adjusting section that adjusts a mirror surface angle of the mirror by turning the mirror together with the covering member, the adjusting section retaining the covering member and being provided with a discharge hole that communicates to a space between the mirror and the covering member, and liquid seeped inside the adjusting section being discharged through the discharge hole to the space between the mirror and the covering member, the adjusting section including:
a case member, and
a holding member that is turnable with respect to the case member that holds the covering member so as to be turned simultaneously with the covering member and the mirror, and at which the discharge hole is provided,
wherein a communication discharge outlet is provided at the covering member and the communicating discharge outlet faces the discharge hole so as to communicate with the discharge hole, and the inside of the adjusting section communicates with the space via the discharge hole and the communicating discharge outlet which are aligned with one another, and further communicates with the discharge outlet via the space.
wherein the communicating discharge outlet is at a location that is different from the location of the discharge outlet, and
wherein the communicating discharge outlet, the discharge outlet and the discharge hole are separate openings with respect to each other.

* * * * *